US010874053B2

(12) United States Patent
Echtenkamp et al.

(10) Patent No.: US 10,874,053 B2
(45) Date of Patent: Dec. 29, 2020

(54) DRAPER BELT WITH A RUBBER INSERT INSIDE THE CLEATS TO INCREASE BELT DURABILITY AND REDUCE FIBERGLASS ROD (71) Applicant: ContiTech Transportbandsysteme GmbH, Hannover (DE)

(72) Inventors: Alan C. Echtenkamp, Waverly, NE (US); David W. Johnson, Lincoln, NE (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 382 days.

(21) Appl. No.: 15/761,435

(22) PCT Filed: Sep. 30, 2016

(86) PCT No.: PCT/US2016/054692
§ 371 (c)(1),
(2) Date: Mar. 20, 2018

(87) PCT Pub. No.: WO2017/146776
PCT Pub. Date: Aug. 31, 2017

(65) Prior Publication Data
US 2020/0236856 A1 Jul. 30, 2020

Related U.S. Application Data (60) Provisional application No. 62/235,058, filed on Sep. 30, 2015.

(51) Int. Cl.
*A01D 57/20* (2006.01)
*A01D 41/14* (2006.01)
(Continued)

(52) U.S. Cl.
CPC ............. *A01D 57/20* (2013.01); *A01D 41/14* (2013.01); *A01D 34/04* (2013.01); *A01D 61/008* (2013.01);
(Continued)

(58) Field of Classification Search
CPC ........ A01D 41/14; A01D 57/20; A01D 61/02; A01D 61/008; A01D 34/04; B65G 15/34; B65G 15/42
(Continued)

(56) References Cited

U.S. PATENT DOCUMENTS 2,305,044 A * 12/1942 Toews .................... B65G 15/42
198/690.2
4,553,663 A * 11/1985 Johnson ................. A01D 61/02
198/465.1
(Continued)

FOREIGN PATENT DOCUMENTS

JP          07002329 A    1/1995
JP          2004231405 A  8/2004

*Primary Examiner* — Robert E Pezzuto
(74) *Attorney, Agent, or Firm* — Gregory Adams; David Cate (57) ABSTRACT

A draper belt (8) having a carry layer (14), a pulley cover layer (13), and a reinforcing layer (12) which is situated between the carry layer (14) and the pulley cover layer (13). The draper belt (8) has a first edge (30) and a second edge (31). The carry layer (14) includes a plurality of cleats (7) which run from the first edge (30) to the second edge (31) of the draper belt. The cleats (7) are reinforced with reinforcing rods which are comprised of a cured rubbery polymer which includes at least 3 phr of reinforcing fibers.

20 Claims, 6 Drawing Sheets

(51) Int. Cl.
  *A01D 34/04* (2006.01)
  *A01D 61/00* (2006.01)
  *A01D 61/02* (2006.01)
  *B65G 15/34* (2006.01)

(52) U.S. Cl.
  CPC .......... *A01D 61/02* (2013.01); *B32B 2433/02* (2013.01); *B65G 15/34* (2013.01); *B65G 2812/02198* (2013.01)

(58) Field of Classification Search
  USPC ........ 56/1, 181; 198/731, 465.1, 803.2, 848, 198/850; 430/127
  See application file for complete search history.

(56) References Cited

U.S. PATENT DOCUMENTS

| | | |
|---|---|---|
| 6,202,397 B1 | 3/2001 | Watts et al. |
| 6,255,379 B1 | 7/2001 | Hahn et al. |
| 7,543,428 B1 | 6/2009 | Puryk et al. |
| 8,544,250 B2 | 10/2013 | Lovett et al. |
| 8,752,359 B2 | 6/2014 | Cormier et al. |
| 9,283,817 B2 * | 3/2016 | Sandstrom .............. B60C 11/04 |
| 2007/0238565 A1 | 10/2007 | Marler |

* cited by examiner

DRAPER BELT WITH A RUBBER INSERT INSIDE THE CLEATS TO INCREASE BELT DURABILITY AND REDUCE FIBERGLASS ROD

RELATED APPLICATION INFORMATION

This Patent Application claims priority to U.S. Provisional Patent Application No. 62/235,058 filed Sep. 30, 2015, and Patent Cooperation Treaty (PCT) Patent Application No. PCT/US2016/054692, filed Sep. 30, 2016, the disclosures of which are incorporated herein in their entirety, by reference.

FIELD

The field to which the disclosure generally relates is harvesting machines, and more particularly to draper belts having significantly more durable cleats.

BACKGROUND

This section provides background information to facilitate a better understanding of the various aspects of the disclosure. It should be understood that the statements in this section of this document are to be read in this light, and not as admissions of prior art.

Agricultural harvesting machines such as combine harvesters are used to reap, thresh, and winnow grain crops such as wheat, rye, barley, corn, soybeans, oats, flax, sunflower, and canola. More specifically, combine harvesters are used to cut grain crops at the base, separate the grains from the remainder of the plant (the chaff), and sort the grain from the chaff. These machines require special adaptations to accommodate specific crops, navigate through field landscapes, and resist damage from the crops, stone, and the elements; especially moisture and high temperature which can lead to the degradation of the machine's rubber components.

Generally harvesting machines gather crops using a header having crop dividers which define crop gathering gaps as the machine moves through a field. The gathered crops are pushed by a reel into a cutter bar, which runs the length of the header and is equipped with teeth made of metal or plastic to cut crops at their base. Headers may have a rigid or flexible header platform depending upon the operator's needs. Flexible header platforms, or "flex headers" have a cutter bar which is capable of flexing over uneven terrain. Machines using flex headers are most often used to cut soybeans, whereas conventional header platforms have a rigid cutter bar and are most often used to cut cereal crops. Freshly cut crops fall behind the cutter bar and onto a plurality of side by side draper belts which are wrapped around parallel spaced rollers. Draper belts function primarily to consolidate crops and move the crops from the header towards the threshing drum. Crops are fed into the threshing drum by spinning augurs. Inside the threshing drum, the grains are shaken from the plant. Grains fall through sieves into a grain collecting tank, and the plant waste, or chaff, is moved to the back of the machine by conveyor belts for later disposal.

Draper belts are an important component of agricultural harvesters. These belts are often subject to prolonged sun exposure, high temperatures, cold temperatures, rain and moisture, dirt and stone, as well as excessive friction from the moving machinery and crops. Furthermore water is known to migrate through the rubber belts carrying corrosive elements and salts which degrade the belt. Draper belts are typically called upon to operate for long periods of time. For these reasons, it is necessary that draper belts be specially adapted to maximize durability and service life, and it is desirable for such adaptations to be cost effective.

Some improvements in reducing the susceptibility of draper belts to damage have been made and are reported in the prior art. U.S. Pat. No. 8,544,250 discloses a draper platform having a center endless belt conveyor that is supported on and between first and second adjacent support arms. The endless conveyor belt has laterally extending cleats bonded thereto that engage the crop and assist in dragging the crop along the belt. U.S. Pat. No. 7,543,428 shows a seamless draper belt formed from an elongated flat base structure of fabric and rubber, and transverse cleats having a structural core embedded in rubber are connected to the base. Cleats formed from a structural core embedded in uncured rubber are positioned on one face of the base structure. The molding and curing of the rubber over the cleat cores and adjacent base structure is done leaving a portion of the base structure adjacent the first and second ends being uncured. The uncured ends are then overlapped and cured to form an endless seamless draper belt.

U.S. Pat. No. 6,817,166 describes a feed draper carrying cleats which are angled to the rollers in two sections converging to a central leading apex to reduce forces on the cleat as they pass over the front guide roller which is of reduced diameter to fit within a small space adjacent the cutter bar. Such cleats are often reinforced by a rod inside the molded material of the cleat, which is generally a resilient natural or synthetic rubber material. The draper canvas having on its outer surface a plurality of generally transversely extending longitudinally spaced cleats attached to the outer surface and extending outwardly there from for engaging the cop and providing a longitudinal force on the crop.

U.S. Pat. No. 7,478,521 discloses a cutting platform for use with an agricultural harvesting machine which includes a plurality of platform sections positioned in end-to-end juxtaposed relation to each other. At least one platform section includes a frame, a plurality of float arms movably coupled with the frame, an endless belt carried by the plurality of float arms, and a cutter bar assembly carried by the plurality of float arms and movable in a localized manner in upwards and downwards directions. The endless belt has a plurality of spaced apart cleats which do not extend to the lateral side edges thereof, allowing the belt to travel between belt guides and upper run carriers without unnecessary clearance space there between.

It is common for draper belts of the prior art to fail for one or more reasons. Frequently draper belt cleats become worn and damaged from use, and this exposes fiberglass rods within the cleats which provide the cleats with lateral support. To reduce this problem, manufacturers of agricultural machinery have redesigned combine headers and the like; however, draper belt cleats remain unusually prone to damage and wear in all known machine and header designs. Accordingly there is a need for a specially adapted draper belt having significantly more durable cleats than draper belts of the prior art.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments of the disclosure are directed to specially adapted draper belts which offer improved durability and extended service life. The draper belts of this disclosure include cleats which are resistant to damage and rod exposure. The cleats of this disclosure are designed with rods made of a fiber reinforced elastomeric material. The elastomeric rods of this disclosure are a significant improvement over the fiberglass rods of the prior art for at least three reasons. First, the elastomeric rods provide excellent lateral support to the cleats while allowing for overall cleat flexibility. Second, the elastomeric rods are more wear resistant than fiberglass rods. Third, the elastomeric rods are more aesthetically pleasing in the event of a damaging event which causes rod exposure, because the elastomeric rods are more visually similar to the cleat material than fiberglass rods.

Some embodiments according to the disclosure more specifically are draper belts having a carry layer, a pulley cover layer, and a reinforcing layer which is situated between the carry layer and the pulley cover layer, wherein the draper belts have a first edge and a second edge, wherein the carry layer includes a plurality of cleats which run from the first edge to the second edge of the draper belt, and wherein the cleats are reinforced with reinforcing rods which are comprised of a cured rubbery polymer which includes at least 3 phr of a reinforcing fiber.

In some aspects draper belts have a pulley cover layer, a carry layer, and a reinforcing layer which is situated between the pulley cover layer and the carry layer, wherein the carry layer includes a plurality of cleats which include reinforcing rods, the improvement which comprises utilizing reinforcing rods which are comprised of a rubbery polymer which includes at least 3 phr of a reinforcing fiber.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and wherein.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
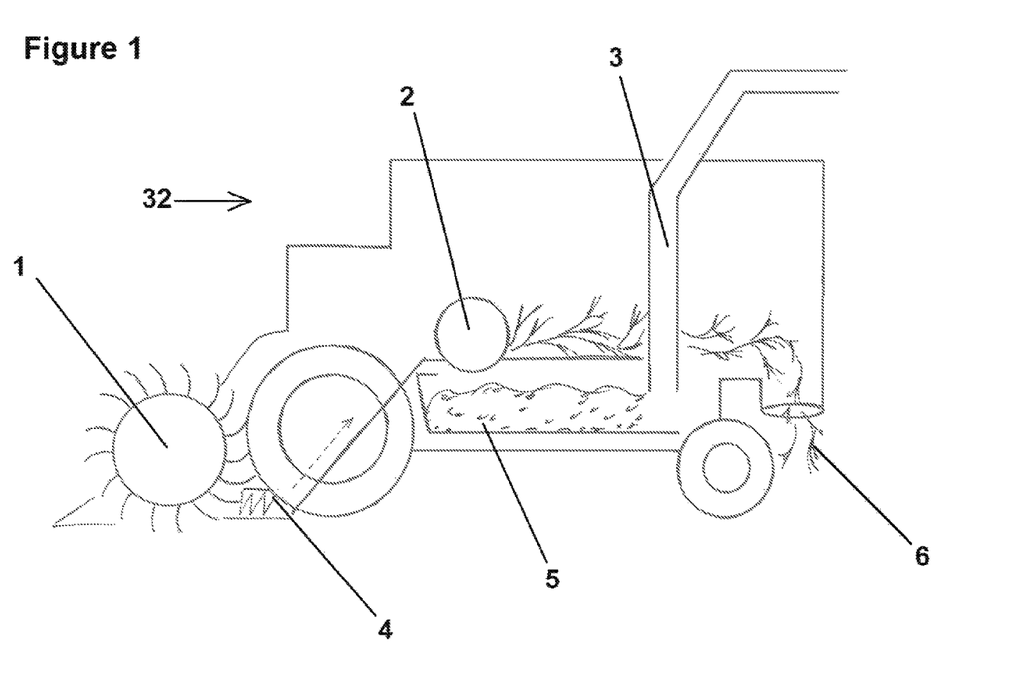
FIG. 1 shows a general cross-sectional view of a conventional agricultural harvesting machine.

FIG. 1 depicts a conventional harvesting machine 32 having a reel 1, a cutter bar 4, a threshing drum 2, and a grain elevator 3. The reel 1 functions to move crops into the cutter bar 4 which cuts the crops at their base using metal or plastic teeth. Cut crops fall upon a plurality of side by side draper belts which consolidate the crops and move them towards the threshing drum 2. The threshing drum 2 beats and breaks the crops to shake the grains 5 from the remainder of the plant, also known as the chaff 6. The grains 5 are collected inside a grain collecting tank. When the grain collecting tank is full, operators dispose of the chaff 6 through the back of the machine 32, and grains 5 are moved from the grain tank by a grain elevator 3.

Figure 2:
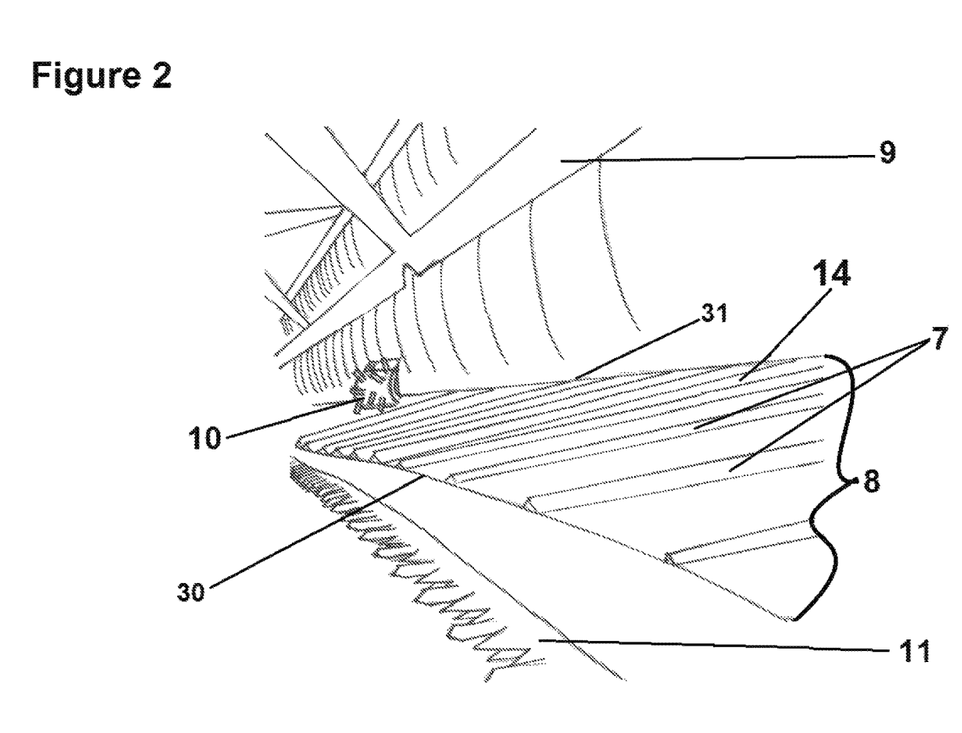
FIG. 2 illustrates a draper belt as used in a conventional agricultural harvesting machine, in a perspective view.

FIG. 2 shows a draper belt 8 of this disclosure as used in a conventional agricultural harvesting machine having a reel 9, a threshing drum 10, and a cutter bar 11. The draper belt 8 is typically an endless belt which forms a continuous loop; the ends of this belt can be fused, bonded, riveted, or secured by a mechanical splice. The draper belt 8 has cleats 7 located on carry layer 14. These cleats 7 typically run from the first edge 30 to the second edge 31 of the draper belt 8. The carry layer 14 and the pulley cover layer of the draper belts of this disclosure can be made utilizing a wide variety of rubbery polymers having the desired combination of physical properties and chemical resistance. Typically, the draper belts of this disclosure 8 have carry layers 14 and pulley cover layers 13 which are comprised of one of more sulfur cured natural or synthetic rubbers. For instance, the carry layer and the pulley cover layer in the draper belts of this disclosure can be comprised of styrene-butadiene rubber (SBR), natural rubber, synthetic polyisoprene rubber, polybutadiene rubber or a blend of various combinations of these rubbers. In many cases, the carry layer and the pulley cover layer of the draper belts of this disclosure will be comprised solely of styrene-butadiene rubber.

Figure 3:
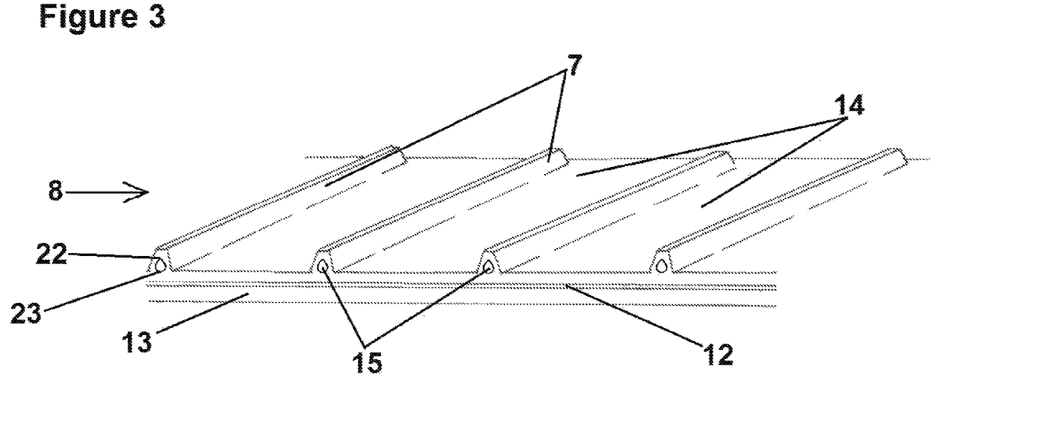
FIG. 3 depicts a portion of a draper belt having cleats in accordance with this disclosure, in a perspective view.
Figure 4:
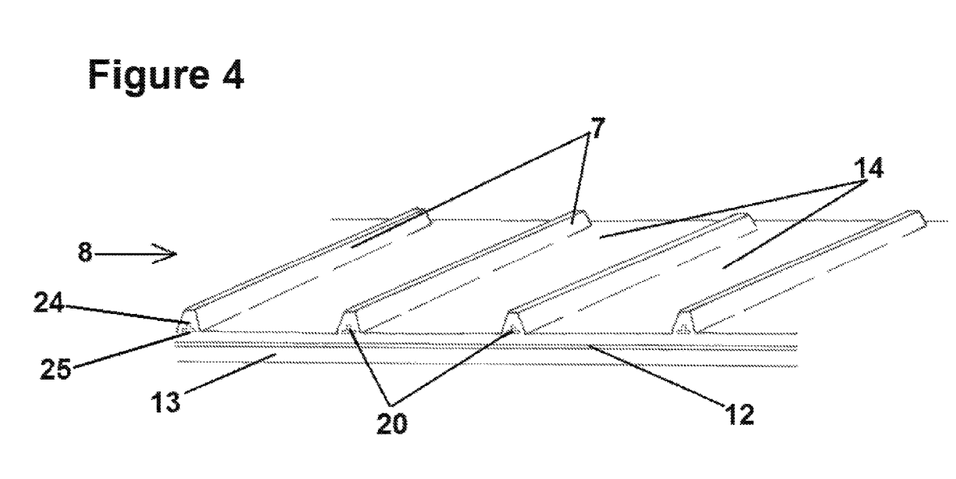
FIG. 4 shows a portion of one embodiment of a draper belt having cleats according to the disclosure, in a perspective view.

FIGS. 3 through 6 show some embodiments of the draper belt 8 according to this disclosure. FIG. 3 shows a draper belt 8 having a carry layer 14, a pulley cover layer 13, and a reinforcing layer 12 located between the carry layer 14 and the pulley cover layer 13. The carry layer 14 includes a plurality of cleats 13 reinforced with reinforcing rods 15. The draper belt 8 of FIG. 3 shows that the reinforcing rods 15 can be designed to have a teardrop cross-sectional shape. The teardrop shaped rod 15 generally has a rounded end 23 pointing towards the reinforcing layer 12 of the belt 8, and a pointed or narrowed end 22 pointing upwards from the carry layer 14 of the belt 8. FIG. 4 shows that the reinforcing rods 20 can be designed to have a "T" shape. The "T" shaped rod 20 has a flattened elongated end 25 facing the reinforcing layer 12 of the belt 8, and a pointed or narrowed end 24 pointing upwardly from the carry layer 14 of the belt.

Figure 5:
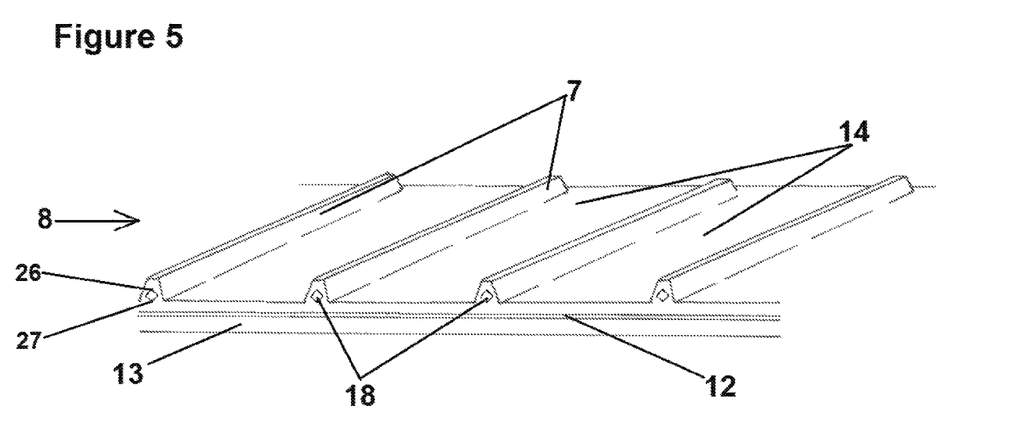
FIG. 5 illustrates a portion of an embodiment of a draper belt having cleats according to the disclosure, in a perspective view; and, FIG. 6 depicts a portion of an embodiment of a draper belt having cleats according to the disclosure, in a perspective view.

The draper belt 8 of FIG. 5 shows that the reinforcing rods 18 of this disclosure can optionally be designed to have a diamond or squared shape. The diamond shaped reinforcing rods 18 may have rounded points or sharp points at each end 26, 27 with each end 26, 27 of the diamond shaped reinforcing rod 18 being substantially the same in size. In alternative embodiments the top end 26 of the diamond shaped rod 18 can be narrower than the lower end 27 of the diamond shaped rod 18.

Figure 6:
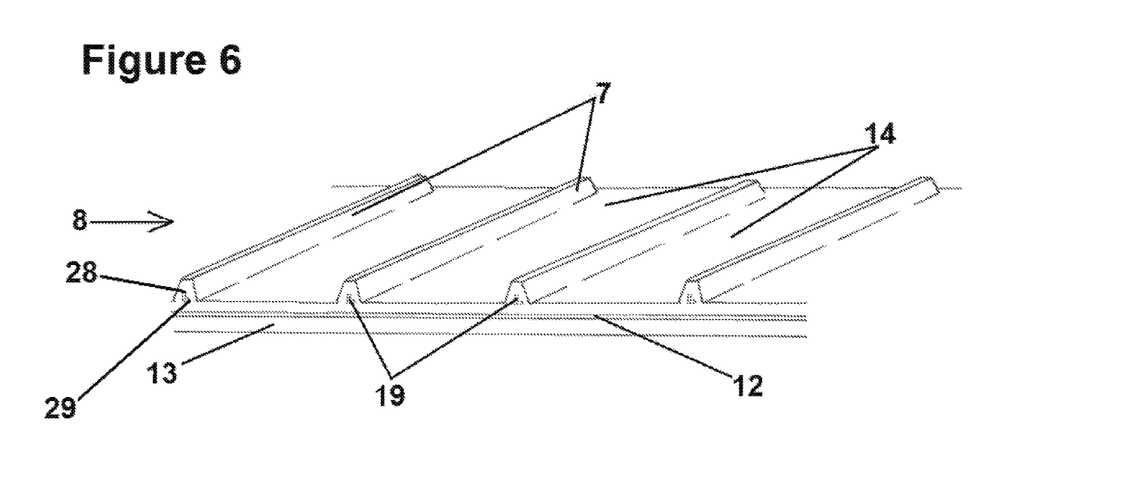

The draper belt 8 of FIG. 6 shows that the reinforcing rods 19 of this disclosure can be designed to have an "L" shape. The "L" shaped rod 19 has a bottom end 29 facing towards the reinforcing layer 12 of the belt 8, and a pointed or narrowed top end 28 pointing upwardly from the carry layer 14 of the belt. The top and bottom ends 28, 29 are roughly perpendicular to one another, in a manner which allows them to meet at an angle of approximately 90°. In alternative embodiments the this disclosure the reinforcing rod can be of a "J" shape in which the bottom end 29 of the reinforcing rod 19 curves away from the top end 28 and ultimately extends into the base of the cleat 7 in a direction which is essentially perpendicular to the orientation of the top end of the reinforcing rod.

The reinforcing elastomeric rods 15, 18, 19, 20, of this disclosure can be of any desirable shape that will adequately reinforce the cleat. The rods 15, 18, 19, 20 can be chemically bonded to the cleats 7, adhered to the cleats 7 with adhesives, or extruded into the cleats 7. In any case, the rods of this disclosure are comprised of a fiber filled cured elastomer. It is preferable for the elastomer utilized in the reinforcing rods 15, 18, 19, 20 to be the same as the elastomer as is utilized in the carry cover and preferably the pulley cover as well to attain the best possible adhesion of the cleat to the rubber in the carry layer of the draper belt. In any case, the rubber utilized in the reinforcing rod can be natural rubber, synthetic polyisoprene rubber, polybutadiene rubber, neoprene rubber, styrene-butadiene rubber or any other rubbery polymer which provides the reinforcing rod with the desired physical and chemical characteristics.

The rubber utilized in the reinforcing rods of this disclosure will be filled with at least 3 phr (parts per hundred parts by weight of rubber) of a reinforcing fiber. The reinforcing fiber can be a natural or synthetic organic or inorganic fiber. For instance, the fiber used to fill the rubbery polymer in the reinforcing rod can be a glass fiber, a carbon fiber, a nylon fiber, a polyester fiber, an aramid fiber, or the like. The fiber reinforcement will be included in the reinforcing rod at a level which is within the range of 3 phr to 45 phr. The reinforcing rods will typically be loaded with from 5 phr to 30 phr of the reinforcing fiber. The reinforcing rods will preferable contain from 10 phr to 20 phr of reinforcing fibers. The rubber in the reinforcing rods can also include up to about 100 phr of a reinforcing filler, such as rubber reinforcing carbon black.

In alternative embodiments of this disclosure the reinforcing rods can be comprised of syndiotactic 1 2-polybutadiene (SPBD). SPBD offers the advantage of providing the needed physical and chemical characteristics needed for the reinforcing rods and can be co-cured into the rubber utilized in the carry layer and/or the pulley cover layer of the draper belt.

As a result of the materials and design of this disclosure, the draper belt 8 of this disclosure is superior to draper belts of the prior art because the rods 15, 18, 19, 20 within the draper belt cleats 7 are comprised of an elastomeric material having high modulus. The elastomeric material having high modulus is more durable than fiberglass. These reinforcing rods 15, 18, 19, 20 provide lateral support to the cleats, while allowing for overall flexibility of the cleat. The reinforcing rods 15, 18, 19, 20 of this disclosure are made using material that are visually similar to the material of the cleat, and for this reason the reinforcing rods 15, 18, 19, 20 are more aesthetically pleasing than conventional fiberglass rods in the event of a damaging event which causes rod exposure.

LIST OF REFERENCE SIGNS (PART OF THE DESCRIPTION)

1 Reel
2 Threshing Drum
3 Grain Elevator
4 Cutter Bar
5 Grains
6 Chaff
7 Cleat
8 Draper Belt
9 Reel
10 Threshing Drum
11 Cutter Bar
12 Reinforcing Layer
13 Pulley Cover Layer
14 Carry Layer
15 Reinforcing Rod
18 Reinforcing Rod
19 Reinforcing Rod
20 "T" Shaped Reinforcing Rod
22 Pointed or Narrowed End
23 Rounded End
24 Pointed or Narrowed End
25 Flattened Elongated End
26 Top End
27 Lower End 28 Pointed or Narrowed Top End
29 Bottom End
30 First Edge
31 Second Edge
32 Harvesting Machine The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A draper belt comprising a carry layer comprising an elastomer, a pulley cover layer comprising the elastomer, and a reinforcing layer which is situated between the carry layer and the pulley cover layer, wherein the draper belt has a first edge and a second edge, wherein the carry layer includes a plurality of cleats which run from the first edge to the second edge of the draper belt, and wherein the cleats are reinforced with reinforcing rods which are comprised of a cured rubbery polymer which comprises at least 3 phr of reinforcing fibers;
   wherein the cured rubbery polymer comprised in the reinforcing rods is the same elastomer which is comprised in the carry layer and the pulley cover layer;
   wherein the reinforcing rods are chemically bonded to the plurality of cleats; and,
   wherein the reinforcing rods are visually similar to the plurality of cleats in the event of damage causing exposure of the reinforcing rods.

2. The draper belt as claimed in claim 1, wherein the reinforcement rods comprise one of cured styrene-butadiene rubber or neoprene.

3. The draper belt as claimed in claim 1, wherein the reinforcing fibers are selected from nylon fibers, aramid fibers, carbon fibers, polyester fibers or glass fibers.

4. The draper belt as claimed in claim 1, wherein the reinforcement rods comprise 3 phr to 45 phr of the reinforcing fibers.

5. The draper belt as claimed in claim 4, wherein the reinforcement rods comprise 5 phr to 30 phr of the reinforcing fibers.

6. The draper belt as claimed in claim 5, wherein the reinforcement rods comprise 10 phr to 20 phr of the reinforcing fibers.

7. The draper belt as claimed in claim 1, wherein the rubber in the reinforcing rods comprise carbon black.

8. The draper belt as claimed in claim 7, wherein the carbon black is present at a level which is within the range of 5 phr to 100 phr.

9. The draper belt as claimed in claim 1, wherein the reinforcing rods have a teardrop cross-sectional shape.

10. The draper belt as claimed in claim 1, wherein the reinforcing rods have a "T" cross-sectional shape.

11. The draper belt as claimed in claim 1, wherein the reinforcing rods have a diamond cross-sectional shape.

12. The draper belt as claimed in claim 1, wherein the reinforcing rods have a square cross-sectional shape.

13. The draper belt as claimed in claim 1, wherein the reinforcing rods have an "L" cross-sectional shape.

14. The draper belt as claimed in claim 1, wherein the reinforcing rods have a "J" cross-sectional shape.

15. A draper belt comprising a carry layer comprising an elastomer, a pulley cover layer comprising the elastomer, and a reinforcing layer which is situated between the carry layer and the pulley cover layer, wherein the draper belt has a first edge and a second edge, wherein the carry layer includes a plurality of cleats which run from the first edge to the second edge of the draper belt, and wherein the cleats are reinforced with reinforcing rods which are comprised of cured syndiotactic 1 2-polybutadiene (SPBD) which comprises at least 3 phr of reinforcing fibers;
   wherein the cured syndiotactic 1 2-polybutadiene (SPBD) comprised in the reinforcing rods is the same elastomer which is comprised in the carry layer and the pulley cover layer;
   wherein the reinforcing rods are chemically bonded to the plurality of cleats; and,
   wherein the reinforcing rods are visually similar to the plurality of cleats in the event of damage causing exposure of the reinforcing rods.

16. The draper belt as claimed in claim 15, wherein the syndiotactic 1 2-polybutadiene (SPBD) is co-cured with a rubbery polymer.

17. The draper belt as claimed in claim 15, wherein the reinforcing fibers are selected from nylon fibers, aramid fibers, carbon fibers, polyester fibers or glass fibers.

18. The draper belt as claimed in claim 15, wherein the reinforcement rods comprise 3 phr to 45 phr of the reinforcing fibers.

19. The draper belt as claimed in claim 15, wherein the reinforcing rods comprise carbon black.

20. The draper belt as claimed in claim 15, wherein the reinforcing rods have at least one of a teardrop cross-sectional shape, a "T" cross-sectional shape, a diamond cross-sectional shape, a square cross-sectional shape, an "L" cross-sectional shape, or a "J" cross-sectional shape.

* * * * *